(12) United States Patent
Rietzler

(10) Patent No.: US 10,140,562 B2
(45) Date of Patent: Nov. 27, 2018

(54) METHOD AND ARRANGEMENT FOR DATA TRANSMISSION

(71) Applicant: Manfred Rietzler, Marktoberdorf (DE)

(72) Inventor: Manfred Rietzler, Marktoberdorf (DE)

( * ) Notice: Subject to any disclaimer, the term of this patent is extended or adjusted under 35 U.S.C. 154(b) by 13 days.

(21) Appl. No.: 15/509,614

(22) PCT Filed: Sep. 15, 2015

(86) PCT No.: PCT/IB2015/001624
§ 371 (c)(1),
(2) Date: Mar. 8, 2017

(87) PCT Pub. No.: WO2016/042382
PCT Pub. Date: Mar. 24, 2016

(65) Prior Publication Data
US 2017/0262744 A1    Sep. 14, 2017

(30) Foreign Application Priority Data
Sep. 16, 2014  (DE) .......................... 10 2014 013 396

(51) Int. Cl.
*G06K 17/00* (2006.01)
*G06K 7/10* (2006.01)

(52) U.S. Cl.
CPC ..... *G06K 17/0022* (2013.01); *G06K 7/10297* (2013.01)

(58) Field of Classification Search
CPC .................... G06K 17/0022; G06K 7/10297
USPC ........................................ 235/375, 385, 492
See application file for complete search history.

(56) References Cited

U.S. PATENT DOCUMENTS

| | | | |
|---|---|---|---|
| 2006/0143439 A1* | 6/2006 | Arumugam ............ | G06Q 10/08 713/153 |
| 2007/0120647 A1* | 5/2007 | Min .................. | H04L 29/12594 340/10.1 |
| 2008/0099566 A1* | 5/2008 | Maus ..................... | G06K 17/00 235/492 |

(Continued)

OTHER PUBLICATIONS

The Notification Concerning Transmittal of International Preliminary Report on Patentability (Chapter I of the Patent Cooperation Treaty), in English, dated Mar. 30, 2017, which was issued by the International Bureau of WIPO in Applicant's corresponding international PCT application having Serial No. PCT/IB2015/001624, filed on Sep. 15, 2015.

(Continued)

*Primary Examiner* — Paultep Savusdiphol
(74) *Attorney, Agent, or Firm* — Bodner & O'Rourke, LLP; Gerald T. Bodner; Christian P. Bodner

(57) ABSTRACT

The invention relates to a method and an arrangement for transmitting an object data record, which is stored in a data memory area of a lower server, to an upper server, wherein the lower server and the upper server are arranged in a server complex comprising at least one upper server, and the servers are arranged on vertically staggered server levels, wherein the explicit association between the object data record and a particular object is made by means of addressing of the server data memory area by an access data record that is stored in an access data memory area of an RFID data storage medium connected to the object, the object data record being transmitted to the upper server by dint of access to the data memory area of the lower server.

24 Claims, 2 Drawing Sheets

(56) References Cited

U.S. PATENT DOCUMENTS

2012/0161934 A1* 6/2012 Maus .................... G06K 17/00
340/10.1
2014/0209693 A1* 7/2014 Nyalamadugu .. G06K 19/07345
235/492

OTHER PUBLICATIONS

The English translation of the International Preliminary Report on Patentability (Chapter I of the Patent Cooperation Treaty), dated Mar. 21, 2017, which was issued by the International Bureau of WIPO in Applicant's corresponding international PCT application having Serial No. PCT/IB2015/001624, filed on Sep. 15, 2015.
The Written Opinion of the International Searching Authority, in English (Mar. 21, 2017—mailed with the English translation of the International Preliminary Report on Patentability), which was issued by the International Bureau of WIPO in Applicant's corresponding international PCT application having Serial No. PCT/IB2015/001624, filed on Sep. 15, 2015.
The International Search Report, in English, issued by the International Bureau of WIPO in Applicant's application having Serial No. PCT/IB2015/001624, dated Jan. 21, 2016, which was corresponding international PCT filed on Sep. 15, 2015.

* cited by examiner

METHOD AND ARRANGEMENT FOR DATA TRANSMISSION

The invention pertains to a method for transferring an object data set stored in a data storage area of a lower server to an upper server, the lower server and the upper server being installed in a server cluster comprising at least one upper server, and the servers being arranged in vertically staggered server levels E1, E2, E3, E4, wherein the unique allocation of the object data set to a specified object is performed either by addressing the server data storage area with an access data set being stored in an access data storage area of an RFID data carrier attached to the object, or by transferring the object data set from a data storage area of the RFID data carrier to a referenced data storage area of the lower server, wherein transferring the object data set to the upper server is performed by access to the data storage area of the lower server.

Beyond that the invention pertains to an arrangement for performing the method.

Corresponding to the current practice objects are provided with RFID data carriers for identification, which RFID data carriers in general are attached to the respective products or objects or also are subcutaneously implanted as injection transponders to beings.

Apart from their quality as identification device RFID data carriers serve as information carriers, which information carrier for example contain data for defining special characteristics of the objects or contain data providing for assigning the objects, hence contain in particular data with respect to the producer or the proprietor. Possibly it is in the interest of the holder or the proprietor of the object being provided with the RFID data carrier that not all of the information or data being stored on the RFID data carrier are available for an open community of users without any restrictions, but rather that the scope and the quality of information being available are dependent of the potential recipient. For example in general product information as to the production price and the intermediate trade shall not be available for the final customer purchasing the product in the retail store. On the other hand it is in the interest of the producer that for example the final customer has access to information enabling for localization of the product, for example to recover a lost or stolen product.

One option to meet the aforementioned need to provide for differentiation as to the scope of information and the restriction of the possible groups of recipients is to attach various RFID data carriers to one object and to restrict the access to a respective RFID data carrier by installing different data connection between each RFID data carrier and one admitted group of recipients. The aforementioned approach on the one hand side turns out to be unfavourably because of the need to attach a plurality of RFID data carriers to one object and on the other hand side turns out to be unfavourably because of the fact that the approach leads to an inflexible information system, since changes as to the kind and scope of information made available for the respective groups of recipients are not possible. Instead it would be necessary to replace the RFID data carriers.

Thus, the present invention is based on the object to provide for a method and an arrangement for transferring information stored on an RFID data carrier such that the transfer of data stored on the RFID data carrier can be modified with respect to the kind and scope of data and the group of recipients in order to create a dynamic information system.

This object is attained with a method according to claim 1.

As to the inventive method there is transferred at least one object data set between an RFID data carrier and a server cluster, wherein the server cluster comprises a lower server and at least one upper server, wherein the servers being arranged in vertically staggered server levels, and the data transfer of an object data set to the upper server is performed indirectly by means of the lower server, such that the data set stored on the RFID data carrier or allocated to the object is stored in a data storage area of the lower server, and the transfer of the data set to the upper server is performed upon access to the data storage area of the lower server. Preferably the RFID data carrier is provided with an identification code for identifying the RFID data carrier.

The objects being subjected to the inventive method can be non-living objects and living objects as well, particularly persons.

In the inventive method the vertically or hierarchically arranged servers form interlinked "cloud servers" of different order, such that the lower server could be described as cloud server of first order and the subsequent first upper server could be described as cloud server of second order and so on. The vertical server arrangement according to the invention provides for new options to implement the "Internet Of Things" or the "Internet Of Everything", providing for including real objects in the virtual world.

The inventive method provides for using the data storage area of the lower server as mailbox in the communication between the RFID data carrier and the upper server. Thus there is prevented for a direct access from the upper server to a data set stored on the RFID data carrier.

Instead the administrator of the lower server defines which data from the data set stored in the data storage area of the lower server are available for the user of the upper server. Thus all of the data of the data set stored on the RFID data carrier can be made available for the user of the lower server, whereas only a restricted data set being restricted according to the definitions of the administrator is made available for the user of the upper server. Upon extension of the administrator rights as to the definition of the available data to upper servers being arranged above the lower, server there is provided for a data transfer with an increasingly restricted data volume, in upward direction from one server to the next server of a vertically staggered server cluster. Thus it is possible to make certain data available for a user which is admitted for access to an upper server arranged on a higher server level which data are different from the data which are available for a user being admitted for access to a server which is arranged in a subjacent level.

For implementing the data transfer there are simplified options since by now NFC (Near Field Communication)-functionality can be integrated into mobile radio devices, in order to offer the user the option to install a data connection between a network server of the global net and a passive NFC data carrier merely by approximating a NFC compatible mobile phone to the NFC data carrier, wherein the mobile phone being connected to the global net via its radio interface. As to future generations of mobile phones one has to assume that a variety of mobile phones are equipped with a NFC data interface such that the mobile phone is able to read and write a NFC data carrier (NFC Reader/Writer Mode) and to exchange information with devices of the same order (NFC Peer-to-Peer Mode).

Beyond that the NFC interface is specified to be compatible with RFID (Radio Frequency Identification)-transmission standard ISO 14443 and ISO 15693. Thus an NFC-enabled device can be used as reader for RFID dara carriers (RFID tags, RFID transponders).

Preferably in the case that there is not intended any user access to the lower server, the latter can serve as a gate for data transmission between the RFID data carrier and the upper server, such that the lower server merely is used to transfer a defined partial quantity of the data of the RFIF data set to the upper server.

An application of the method for a variety of different objects can be performed in a particular favorable manner if the lower server contains a plurality of object data or object data sets, wherein the object data are uniquely allocated to an object by an RFID data carrier and the object data sets are uniquely allocated to a plurality of different objects by a number of RFID data carriers corresponding to the number of objects, wherein merely the lower server provides for an access to all of the object data or object data sets and the upper server each merely provides for an access to specified object data or object data sets.

A particular favorable hierarchical order of access is possible, when the number of users being admitted to that server will be the higher the higher a server is arranged in the vertical server cluster.

If a data storage area on the lower server is allocated to the RFID data carrier and an access to a data storage area of the RFID data carrier is performed via an address area of the lower server, the lower server is not only able to serve as a mailbox for the RFID data carrier, as described afore, but beyond that the data storage area of the RFID data carrier can be addressed by the lower server in order to change the RFID data set.

Preferably the access to the address area of the lower server is performed via an RFID administrator, which for example can be the owner of the RFID data carrier being authorized for access to the RFID data carrier or to the object being identified with the RFID data carrier.

If the access to the address area of the lower server from the upper server is configured by the RFID administrator, there can be installed an access to the address area for the user of the upper server, if need should arise, such that for example the user can list a purchase option on the RFID data carrier.

If the allocation of the object data set to the data storage area of the lower server is performed by an address data set identifying the lower server, there is defined an unambiguous allocation between the RFID data carrier and a certain lower server.

Preferably the address data set is stored on the RFID data carrier, such that a standard transfer device can be used for transferring the data set to the data storage area, the transfer device must not be equipped with a special kind of allocation, hence an addressing to the lower server, which can be for example a mobile radio device with an integrated NFC (Near Field Communication)-interface.

That kind of transmission devices, providing for a wireless transmission route between devices approximated to each other and provide for a data transfer to a network server are already largely standardized. On the technical field of near field communication, particularly there is to mention the data interface specified according to the NFC (Near Field Communication) mode (ISO/IEC18092, ISO/IEC 21481), which is specified to be compatible with the RFID (Radio Frequency Identification) transmission standards ISO 14443 and ISO 15693. Thus, upon approximating an NFC-enabled mobile radio device being able to emulate an RFID interface, the RFID data carrier gets in interaction with the electromagnetic field emitted by the mobile radio device in such a way, that the information stored on the RFID data carrier can be read and processed. In that kind of system the RFID data carrier serves as a pure passive device getting its energy from the electromagnetic alternating field of the mobile radio device which mobile radio device initiates the transmission. Thereby the installation of the connection and the data transmission take place without need for any manual configuration of the devices communicating with each other.

In general the data transmission between the RFID data carrier and the lower server can be performed by means of a reader device comprising two interfaces, wherein the first interface provides for a data connection between the RFID data carrier and the reader device and the second interface provides for a data connection between the reader device and the lower server.

Thereby the allocation of the object data set to the data storage area of the lower server can be performed by an address data set being stored in the reader device and identifying the lower server.

Preferably the reader device not only provides for a transmission of the RFID data set but also preferably provides for a data transfer between the address area of the lower server and the data storage area of the RFID data carrier.

For uniquely security marking of the RFID data carrier the object data set of the RFID data carrier additionally to an identification code of the RFID data carrier can comprise authentication data, which authentication data are deposited in the data storage area of the RFID data carrier via a data connection between the RFID data carrier and an authentication device. Thus it is for example possible to deposit an electronic signature based on a unique ID number of the RFID data carrier which for example can be embodied as a tag, which ID number for authentication is combined with a qualified certificate.

According to a particular favorable embodiment the data of the object data set being stored on the RFID data carrier are allocated to different storage locations of the data storage area of the lower server, and the administrator defines individual access rights for access to the storage locations, such that it is made sure, that the user of the upper server has access only to selected data and hence to such data being released by the administrator.

In order to attain the object underlying the invention the inventive arrangement comprises the features of claim 16.

The inventive arrangement for processing a method according claim 1 comprises a server cluster having a lower server and at least one upper server, wherein the servers are arranged in vertically staggered server levels and the servers being connected with each other via data links, wherein the lower server is connected with the RFID data carrier via a data link.

Preferably a data storage area on the lower server is allocated to the RFID data carrier, and the lower server has an address area providing for an access to the data storage area of the RFID data carrier.

For data transmission between the lower server and the RFID data carrier there is preferably provided for a data transfer device, which data transfer device comprises a reader device having a first interface for transferring the object data set of the RFID data carrier to the reader device and the reader device having a second interface for transferring the object data set from the reader device to the lower server.

If the first interface is embodied as a NFC-interface, preferably there can be used a mobile radio device, particularly a mobile phone having an integrated NFC interface, as a reader device.

The first interface can be embodied as an NFC interface, but also can be embodied as an UHF interface in a possible further version.

The second interface is preferably embodied as a radio interface.

Particularly if the data transfer device is embodied as a mobile radio device, for example a mobile phone, providing for a reader device is possible without sophistic instrumentation.

Preferably the reader device serves for displaying the storage content or status information of the RFID data carrier and is embodied correspondingly, such that for example the reader device displays optically on a monitor or acoustically by loudspeakers from which server level the access to the RFID data set is made, or there is displayed, when data are added to the RFID data carrier by the administrator.

If the upper server is embodied as a network server of a global network, there is defined a highest server level from which all of the internet users have free access to those data of the RFID data set to which data the administrator enables access up to the highest server level.

Further favorable features of the method and arrangement will be evident by the following description and the drawings illustrating preferred embodiments of the invention.

Figure 1:
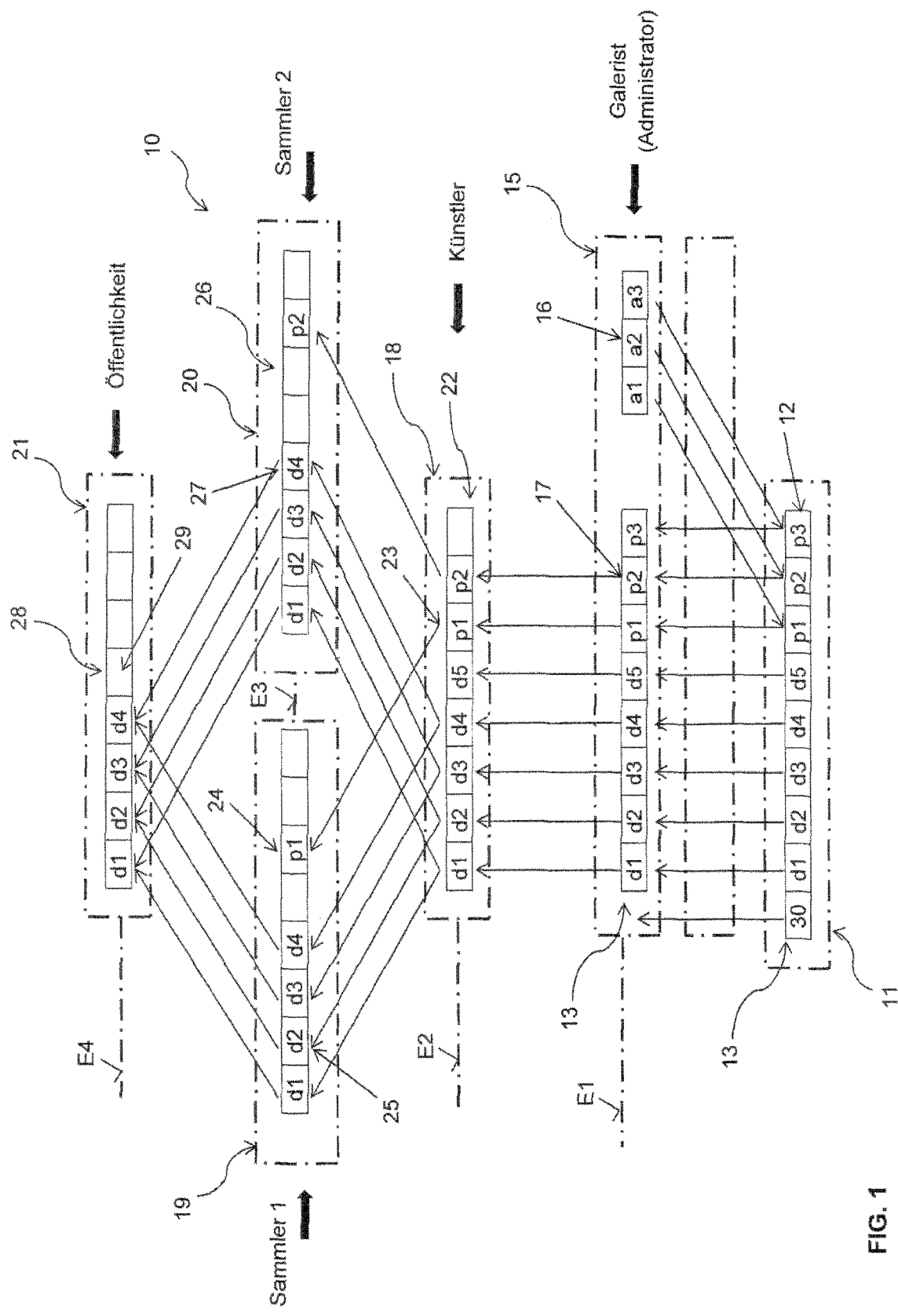
FIG. 1 shows a schematic view of the arrangement according to one possible embodiment.

FIG. 1 shows a schematic view of an arrangement 10 having the essential components defining the structure of the method. There is shown an RFID data carrier 11, which for example can be embodied as a so called transponder tag and which is attached to an art object, for example a painting or a sculpture. The RFID data carrier 11 has a data storage area 12 containing a data set 13 comprising a plurality of data describing the art object, wherein in the present embodiment illustrating the application of the method on selling of art objects the data contain the following information: d1:=gallery owner; d2:=artist; d3:=work description; d4:=work reproduction; d5:=conditions, in particular the amount of the artists share with respect to the sales revenue of the gallery owner; p1:=price; p2:=price 2; p3:=blacklist.

The RFID data carrier 11 is connected to the lower server 15 of a lower server level E1 via a reader device 14 being for example embodied as a mobile radio device having an NFC interface, wherein in the present case there is an exclusive access to the lower server 15 only for the gallery owner as administrator.

The data set 13 contains apart from data d1 to d5, which data are directly allocated to the art object, for example a painting, and describing the painting and which data are defining the business relationship between the artist and the gallery owner, additional data p1 to p3, which data are alterable parameters and can be entered in an address area 16 of the lower server 15 by the administrator.

The data p1 to p3 are transferred to the data storage area 12 of the RFID data carrier by means of the reader device 14, such that the complete data set 13 can be imported into a data storage area 17 of the lower server 15 by means of the reader device 14. The data storage area now serves as a mailbox for a server 18 of an upper server level E2.

The upper server 18 and further upper servers 19, 20 and the uppermost server 21 as well are embodied as network servers being linked to the lower server 15. The interlinking of the servers 15, 18, 19, 20,21 for example can be made via the internet, wherein the administrator defines which data of the complete RFID data set 13 stored in the data storage area 17 of the lower server 15 are transferred to the respective server 18, 19, 20 or 21 by means of an addressing of the upper servers 18, 19, 20 and the uppermost server 21. Thus the administrator configures the allowed data access from the respective server 18, 19, 20 or 21 to the RFID data set 13.

In the case of the presented embodiment only for the artist there is an allowed access to the server 18 of the server level E2. Thus the artist has access to a data storage area 22 containing a restricted data set 23 comprising merely the data d1 to d5 and p1, p2, which are made available for the artist by the administrator, hence in this case the gallery owner. Thus the artist does not have any access to the data p3, which data contain the "black list" and hence those data with reference to potential buyer or art collectors, being allocated to the artist by the owner of the gallery, who yet has no interest to communicate their identity to the artist.

The data set 23 stored in the data storage area 22 according to the configuration of the administrator in each case is transferred merely restricted to the two servers 19, 20 of the next upper server level E3, such that a first group of potential buyers or art collectors 1 by access to a data storage area 24 gets a data set 25 comprising the data 1 to d4 with respect to the art object and generally being important to know for art collectors and the price information p1 selected by the owner of the gallery for art collectors 1. Another group of art collectors 2 gets a data set 27 by access to a data storage area 26 of the server 20, which data set 27 comprises the same data d1 to d4 like the data set 25 but comprises an alternative price information p2.

Finally there is provided in a uppermost server level E4 the server 21 which is available for the public without any restriction and who comprises in a data storage area 28 a data set 29 which contains merely the data d1 to d4 describing the art object without the price information data being intended for the art collectors 1 and 2.

Figure 2:
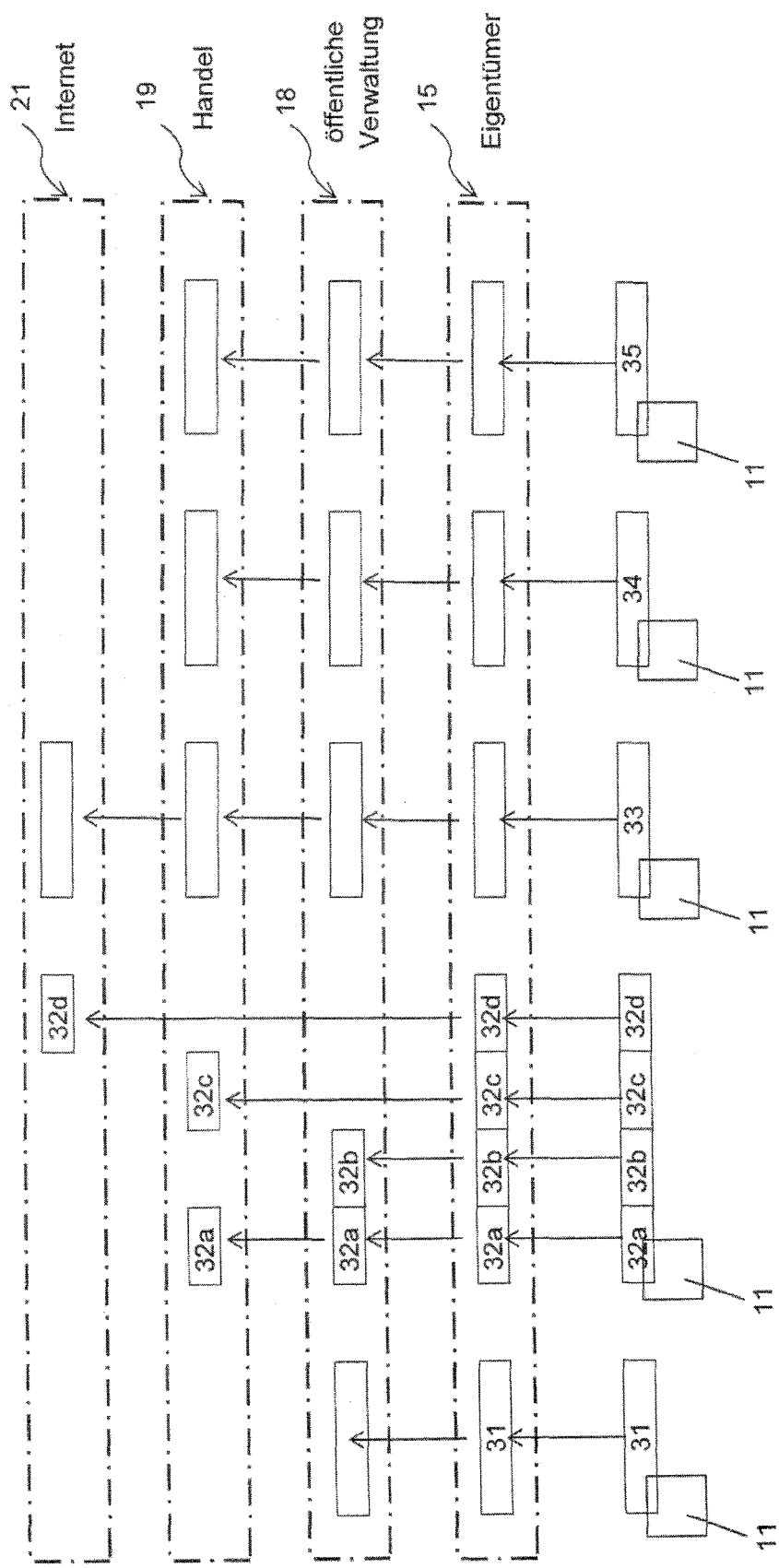
FIG. 2 shows a schematic view of the arrangement for illustrating one possible embodiment.

FIG. 2 shows an embodiment with a lower server 15 containing a plurality of object data sets 31, 32, 33, 34, 35 being allocated to different objects, wherein the object data sets in each case are uniquely allocated to one object by means of an RFID data carrier 11. In the case of the present embodiment the object data set 31 pertains to an personal identification document, the object data set 32 to a vehicle, the object data set 33 to a mobile phone, the object data set 34 to a container, the object data set 35 to a product contained in the container.

The lower server 15, which is available only for the owners of the objects, contains all of the data sets 31 to 35. The owners configure the access rights for the upper servers 18, 19, 21 being vertically arranged server 18, 19, 21 of the server cluster by corresponding upward links, wherein in the present case the server 18 is a server which is only available for the public administration, the server 19 is only available for a defined dealer association and the server 21 is freely available in the internet. This means that the higher the respective server 18, 19, 21 is arranged in the vertical server cluster the higher is the number of users being admitted to that server.

For example apart from the owner of the personal identification document the access to personal data contained in the object data set 31 is only available for the public administration. As to the object data 32 allocated to the vehicle there is installed a differentiated access, such that server 18 merely provides for access to the vehicle owner data 32a and the vehicle data 32b being relevant for the vehicle tax, the server 19 merely provides for access to vehicle owner data 32a and the maintenance data 32c being specific for the vehicle, whereas the server 21 provides for access to sales data 32d being relevant for a sales offer in the internet.

The invention claimed is:

1. A method for transferring an object data set stored in a data storage area of a lower server to at least one upper server, the lower server and the at least one upper server being installed in a server cluster, and the lower server and the at least one upper server being arranged in vertically staggered server levels, wherein a unique allocation of the object data set to a specified object is performed either by addressing the server data storage area with an access data set being stored in an access data storage area of an RFID data carrier attached to the object, or by transferring the object data set from a data storage area of the RFID data carrier to a referenced data storage area of the lower server, wherein transferring the object data set to the upper server is performed by access to the data storage area of the lower server.

2. Method according to claim 1,
wherein the lower server serves as a gate for data transferring between the RFID data carrier and the upper server.

3. Method according to claim 1,
wherein the lower server comprises a plurality of object data or object data sets being allocated to an object, wherein the object data are uniquely allocated to an object by an RFID data carrier and the object data sets are uniquely allocated to a plurality of different objects by a number of RFID data carriers corresponding to the number of objects, wherein only the lower server provides for an access to all of the object data or object data sets, and the upper servers each providing only access to specified object data or object data sets.

4. Method according to claim 3,
wherein the higher a server is arranged in the vertical server cluster the higher is the number of users being admitted to that server.

5. Method according to claim 1,
wherein the RFID data carrier comprises a data storage area and an object data set is transferred from the data storage area of the RFID data carrier to the data storage area of the server, wherein a data transfer is performed between the RFID and the upper server by means of the lower server.

6. Method according to claim 5,
wherein an access to the data storage area of the RFID data carrier is performed via an address area of the lower server.

7. Method according to claim 6,
wherein the access to the address area of the lower server is performed via an RFID administrator.

8. Method according to claim 6,
wherein the access to the address area of the lower server from the upper server is configured by the RFID administrator.

9. Method according to claim 5,
wherein the allocation of the object data set to the data storage area of the lower server is performed by an address data set identifying the lower server.

10. Method according to claim 9,
wherein the address data set is stored on the RFID data carrier.

11. Method according to claim 1,
wherein the data transfer between the RFID data carrier and the lower server is performed by means of a reader device comprising two interfaces, wherein the first interface provides for a data connection between the RFID data carrier and the reader device and the second interface provides for a data connection between the reader device and the lower server.

12. Method according to claim 11,
wherein the allocation of the object data set to the data storage area of the lower server is performed by an address data set being stored in the reader device and identifying the lower server.

13. Method according to claim 11,
wherein the reader device provides for a data transfer between the address area of the lower server and the data storage area of the RFID data carrier.

14. Method according to claim 1,
wherein the object data set of the RFID data carrier additionally to an identification code of the RFID data carrier comprises authentication data, which authentication data are stored in the data storage area of the RFID data carrier via a data connection between the RFID data carrier and an authentication device.

15. Method according to claim 1,
wherein the data of the object data set being stored on the RFID data carrier are allocated to different storage locations of the data storage area of the lower server and the administrator defines individual access rights for access to the storage locations.

16. An arrangement for processing a method according claim 1 comprising a server cluster having a lower server and at least one upper server, wherein the lower server and the at least one upper server are arranged in vertically staggered server levels and the lower server and the at least one upper server being connected with each other via data links, wherein the lower server is connected with the RFID data carrier via a data link.

17. Arrangement according to claim 16,
wherein a data storage area on the lower server is allocated to the RFID data carrier, and the lower server has an address area providing for an access to the data storage area of the RFID data carrier.

18. Arrangement according to claim 16,
wherein a data transfer device provides for the data transfer between the lower server and the RFID data carrier, which data transfer device comprises a reader device having a first interface for transferring the object data set of the RFID data carrier to the reader device and the reader device having a second interface for transferring the object data set from the reader device to the lower server.

19. Arrangement according to claim 18,
wherein the first interface is embodied as a NFC-interface.

20. Arrangement according to claim 19,
wherein the first interface is embodied as a UHF-interface.

21. Arrangement according to claim 18,
wherein the second interface is embodied as a radio interface.

22. Arrangement according to claim 18,
wherein the data transfer device is embodied as a mobile radio interface.

23. Arrangement according to claim 18,
wherein the reader device serves for displaying the storage content or status information of the RFID data carrier.

24. Arrangement according to claim 16,
wherein the upper server is embodied as a network server of a global network.

* * * * *